3,296,125
PROCESS FOR THE PURIFICATION OF WASTE WATER

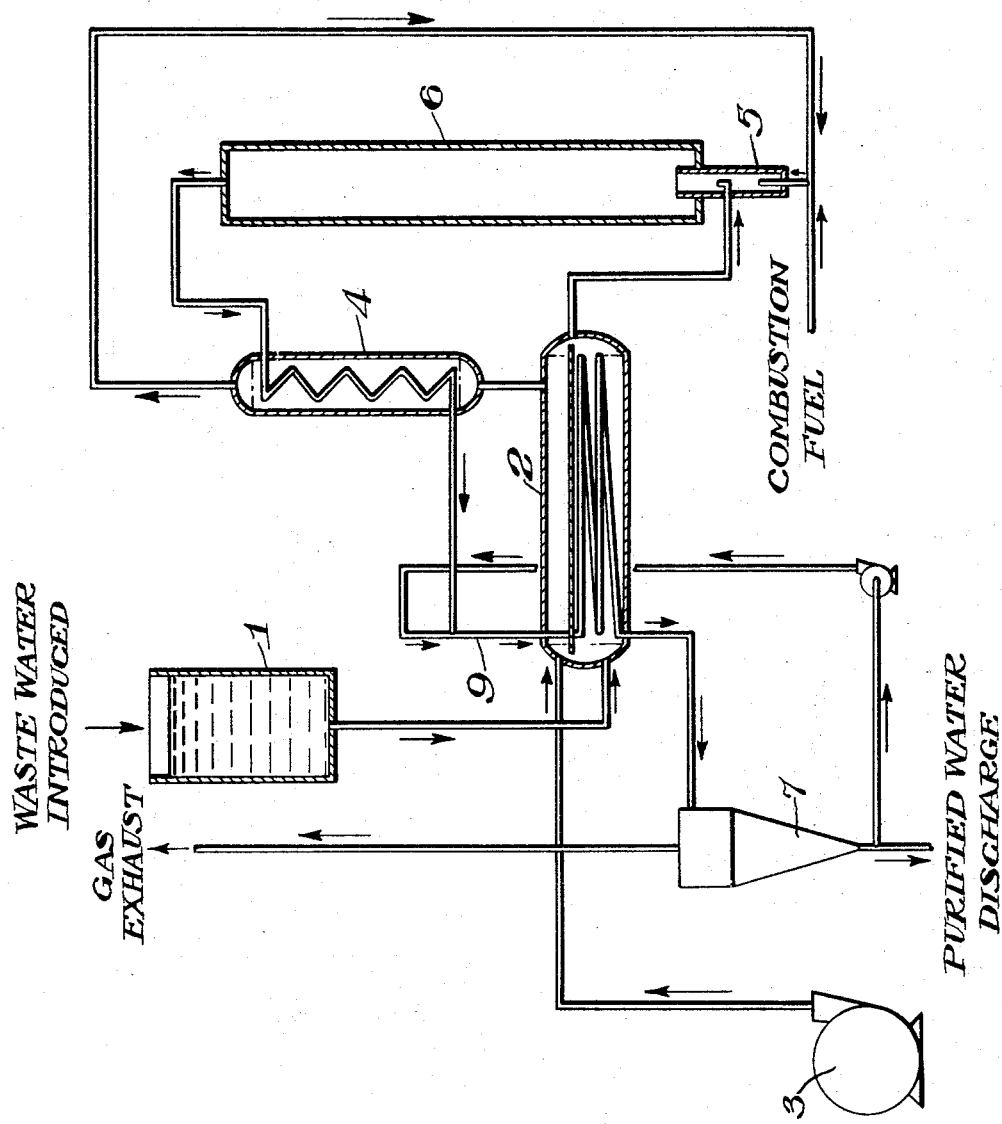

Gerhard Hegner, Dortmund, Deggingstrasse 10–12, Germany, assignor to Friedrich Uhde GumbH, Dortmund, Germany
Filed Oct. 13, 1964, Ser. No. 403,573
Claims priority, application Germany, Oct. 17, 1963, V 10,203
2 Claims. (Cl. 210—63)

This invention relates to a process for the purification of waste water which mainly contains organic impurities in dissolved, suspended, or colloidal form.

There are already many processes known which carry out waste water purification in mechanical, chemical, or biological manners. In most cases flocculent chemicals or biological slurry is used. The slurry resulting there usually contains over 95% water and can in this condition, therefore be thrown on the dump. It is necessary to expend additional apparatus and work in order to obtain it in solid form or after further dehydration to be able to burn it. Since the effectiveness of the slurry formation and separation essentially depends on the duration of time, very large basins and ground surfaces are required. However, these large basins and ground surfaces are not always available and therefore make waste water purification often very problematical.

In a known wet burning process, these difficulties are avoided to a certain extent. This process consists of the disintegration of the organic, dissolved material by oxidation with air at temperatures between 100° C. and the critical temperature of the water, especially between 220° C. to 320° C., and at pressures between 50 and 150 atmospheric excess pressure in an autoclave. Since the process runs off in the liquid phase, it is necessary that one choose the operating pressure of the reactor at 20–50 atmospheric excess pressure higher than the vapor pressure of the water at operating temperature, with reference to the air present and the other gases resulting from the oxidation. In this manner, the highest achievable temperature is limited by the vapor pressure, making impossible the oxidation of some compounds (e.g. methanol in the liquid phase). This, however, limits the utilization of this process for the purification of industrial waste water.

An object of this invention is to provide an effective process for purifying waste water.

In accordance with this invention the waste water which contains organic impurities in dissolved, suspended or colloidal form is heated in its fluid phase by hot oxygen-containing gases or by burner operating with excess of air to such an extent that the impurities are oxidized. In an advantageous form of this invention the oxidation is carried out in a multi-step process.

Novel features and advantages of the present invention will become more apparent from a study of the following description and drawing in which the single figure shows a schematic view of the process of one embodiment of this invention.

According to this invention it is possible to purify waste water having predominantly organic impurities of different compositions to the extent necessary in that the water is brought in its fluid phase to a reaction chamber by being overheated with hot, oxygen-containing gases or waste gases or immediately with burners working with excess air, until the desired oxidation temperature is reached. By the expression "fluid" is meant liquid and/or vaporous or as a water-vapor air mixture. Since in this process the work range lies in the overheated vapor area, a very quick and complete disintegration of the organic impurities is achieved. As a result, no clurry is precipitated, while the ash residues can be removed in a simple manner. The inventive process is carried out at normal pressure, so that the operating pressure of the equipment has no influence on the achievable temperature, and the latter can thus be adjusted to the requirements of the apparatus or the waste water. In such manner, the introduction of corrosion and heat resistant materials, including ceramic linings, is also possible.

Since the oxidation processes are exothermic, per the degree of impurities in the waste water, the corresponding amount of heat energy can be saved. Consequently, this process, contrary to biological equipment, operates most economically with waste waters heavily impurified organically. Its introduction is therefore advantageous where concentrated waste water is precipitated immediately at the production operation without previous mixing with cooling water or rain water. With such introduction it is furthermore achieved that the amount of water to be treated is relatively small and therefore requires only small equipment.

With reference to the balance of energy in the inventive process, it is effective to use extensively, by skillful heat exchange, the heat brought in for preheating, evaporation and overheating of the untreated water.

The inventive process is described more precisely by means of the drawing.

The water to be purified flows from the reservoir 1 to the preheated and vaporizer 2 where it is heated with the air for combustion 3 required for the burner 5. By the thus-achieved vapor pressure lowering of the water, it is possible to evaporate, corresponding to the preheating temperature chosen, a more or less large portion of the waste water as well as the volatile constituents eventually contained therein already at temperatures below 100° C. This vapor-air mixture then continues further in the overheater 4, wherein it is overheated and finally, mixed with fuel, it is conducted to a burner 5. The waste water not vaporized in the preheater 2 overflows to the reactor 6 and is there vaporized and overheated by the hot combustion gases. Since the burner operates with excess of air, the organic impurities of the waste water are oxidized by the free air oxygen and disintegrated. The amount of heat set free can save on fuel energy.

The hot exhaust gases of the reactor are then conducted to the overheater 4 where they give off a part of their heat content to the vapor air mixture to be heated, without cooling off so much that eventually vaporous, anorganic impurities could be precipitated or condensed from the water vapor. At 9 from the already purified waste water or from other pure water available, such an amount of water is injected into the exhaust gas that its temperature is lowered to the thaw point temperature, and accordingly further eventual precipitation can be dissolved or washed away by the injection water so that the precipitation does not become lodged in the heat exchanger 2.

Since the vapor content of the waste water is always greater than the vapor air mixture, even without the additional water injection at 9 the thaw point temperature of the exhaust gas must be in any case above the boiling temperature of the waste water in 2. Thus, an effective heat exchange of condensing vapor with the boiling liquid at small exchange surfaces is possible as well as the recovery of a large portion of the heat brought in.

The amount of heat available behind the exchanger 2 can also be used economically for other purposes or the mixture goes directly to a separator 7 where the condensate is separated from exhaust gas.

Obviously, many modifications and variations of the present invention are possible in light of the above teachings. It is therefore to be understood that within the scope of the appended claims the invention may be practiced otherwise than as specifically described.

What is claimed is:

1. In the process for the purification of waste water containing predominantly organic impurities including the steps of conveying the waste water in a fluid phase to a preheater and vaporizer of the purification system, mixing the waste water and combustion air to lower the vapor pressure of the water, preheating the mixture of air and water at a temperature below 100° C. whereby a portion of the waste water and of its volatile constituents are vaporized, conveying the vapor-air mixture to an overheater, overheating the vapor-air mixture, mixing the overheated vapor-air mixture with combustion fuel, conducting the vapor-air mixture and combustion fuel to a burner which operates with excess of air, oxidizing the impurities of the mixture by the burner and forming hot combustion gases, said oxidation being carried out under atmospheric pressure, passing said hot combustion gases into a reactor, conveying the remaining unvaporized water in the preheater from the preheater to the reactor where it is vaporized and overheated by said hot combustion gases, conducting the hot exhaust gases formed in the reactor to the overheater, utilizing the heat from the exhaust gases to heat vapor-air mixture in the overheater, and discharging the purified water from the system.

2. In the process as set forth in claim 1 wherein the oxidation is carried out by hot oxygen-containing gases.

References Cited by the Examiner

UNITED STATES PATENTS

| 2,903,425 | 9/1959 | Zimmerman | 210—63 |
| 2,932,613 | 4/1960 | Huesler et al. | 210—63 |
| 2,944,396 | 7/1960 | Barton et al. | 210—63 X |
| 3,178,260 | 4/1965 | Tirado | 23—48 |

MORRIS O. WOLK, *Primary Examiner.*

MICHAEL E. ROGERS, *Examiner.*